(12) United States Patent
Nagai (10) Patent No.: US 8,619,195 B2
(45) Date of Patent: Dec. 31, 2013

(54) DISPLAY APPARATUS AND DISPLAY METHOD

(75) Inventor: Tsutomu Nagai, Kanagawa (JP)

(73) Assignee: Sony Corporation (JP)

( * ) Notice: Subject to any disclaimer, the term of this patent is extended or adjusted under 35 U.S.C. 154(b) by 691 days.

(21) Appl. No.: 12/459,449

(22) Filed: Jul. 1, 2009

(65) Prior Publication Data

US 2010/0002072 A1  Jan. 7, 2010

(30) Foreign Application Priority Data

Jul. 2, 2008  (JP) .............................. P2008-173006

(51) Int. Cl.
*H04N 5/52* (2006.01)

(52) U.S. Cl.
USPC .......................................... 348/678; 348/679

(58) Field of Classification Search
None
See application file for complete search history.

(56) References Cited

U.S. PATENT DOCUMENTS

| | | | |
|---|---|---|---|
| 6,002,386 A | 12/1999 | Gu | |
| 6,233,004 B1 * | 5/2001 | Tanaka et al. | 348/48 |
| 2006/0192847 A1 | 8/2006 | Watanabe | |
| 2007/0154082 A1 * | 7/2007 | Rhodes | 382/154 |
| 2008/0036790 A1 * | 2/2008 | Ishiyama | 345/642 |
| 2008/0316372 A1 * | 12/2008 | Xu et al. | 348/739 |

FOREIGN PATENT DOCUMENTS

| | | | |
|---|---|---|---|
| JP | 1290385 A | | 11/1989 |
| JP | 4132487 A | | 5/1992 |
| JP | 04192762 A | | 7/1992 |
| JP | 10282877 A | | 10/1998 |
| JP | 2000132152 A | | 5/2000 |
| JP | 2000-221953 A | | 8/2000 |
| JP | 2002055675 A | * | 2/2002 |
| JP | 2002116728 A | | 4/2002 |
| JP | 2002175067 A | | 6/2002 |
| JP | 2003202850 A | | 7/2003 |
| JP | 2004-213486 A | | 7/2004 |
| JP | 2005-208182 A | | 8/2005 |
| JP | 2005315956 A | | 11/2005 |

OTHER PUBLICATIONS

European Search Report, EP 09164394 dated Nov. 4, 2009.

* cited by examiner

*Primary Examiner* — Mehrdad Dastouri
*Assistant Examiner* — James Anderson, II
(74) *Attorney, Agent, or Firm* — Lerner, David, Littenberg, Krumholz & Mentlik, LLP

(57) ABSTRACT

A display apparatus includes a sight line detection unit that detects a line of sight of a user by analyzing user video information, an enhancement processing unit that detects an intersection point of the line of sight of the user detected by the sight line detection unit and a video display surface of a monitor as an attention point, which is a point on which the user focuses attention, and performs enhancement processing for the monitor by setting a higher gain amount in stages from a position of a longer distance from the attention point toward a position of a smaller distance, and a display video output control unit that outputs video via the monitor based on the gain amount set by the enhancement processing unit and display video information whose input is received by a display video information input unit.

9 Claims, 10 Drawing Sheets

DISPLAY APPARATUS AND DISPLAY METHOD

CROSS-REFERENCE TO RELATED APPLICATION

The present application claims priority from Japanese Patent Application No. JP 2008-173006 filed in the Japanese Patent Office on Jul. 2, 2008, the entire content of which is incorporated herein by reference.

BACKGROUND OF THE INVENTION

1. Field of the Invention

The present invention relates to a display apparatus and a display method. More particularly, the present invention relates to a display apparatus capable of displaying video providing a sense of perspective in accordance with the line of sight of a user and a display method.

2. Description of the Related Art

In related art, enhancement processing adapted to video itself to be output to a monitor has been performed. Here, the enhancement processing is processing to improve sharpness of video so that sharper video is presented to the user. However, enhancement processing adapted to video itself to be output to a monitor does not have in most cases three-dimensional information added to the video itself and thus, the video after being processed may be different from what the user likes.

Moreover, for example, in Japanese Patent Application Laid-Open No. 2000-221953, a technology to perform image processing in accordance with a detected result after shooting a user by a camera and detecting the line of sight of the user using the shot image is disclosed.

[Patent Document 1] Japanese Patent Application Laid-Open No. 2000-221953

SUMMARY OF THE INVENTION

However, according to the technology disclosed in Japanese Patent Application Laid-Open No. 2000-221953, there is an issue that while image processing can be performed in accordance with the line of sight of the user, it is difficult to display video providing a sense of perspective in accordance with the line of sight of the user.

The present invention has been made in view of the above issue, and it is desirable to provide a technology capable of displaying video providing a sense of perspective in accordance with the line of sight of the user.

According to an embodiment of the present invention, there is provided a display apparatus, including: a display video information input unit that receives input of display video information to be a source of video displayed in a monitor; a user video information input unit that receives input of user video information, which is acquired by a camera and video information of a user watching video displayed in the monitor; a sight line detection unit that detects a line of sight of the user by analyzing the user video information whose input is received by the user video information input unit; an enhancement processing unit that detects an intersection point of the line of sight of the user detected by the sight line detection unit and a video display surface of the monitor as an attention point and performs enhancement processing for the monitor by setting a higher gain amount in stages from a position of a longer distance from the attention point toward a position of a smaller distance; and a display video output control unit that outputs video via the monitor based on the gain amount set by the enhancement processing unit and the display video information whose input is received by the display video information input unit.

According to the above configuration, sharpness of video displayed in a portion of a high degree of attention by the user can be improved. Thus, video providing a sense of perspective in accordance with the line of sight of the user can be displayed.

According to the embodiments of the present invention described above, it becomes possible to display video providing a sense of perspective in accordance with the line of sight of the user.

DETAILED DESCRIPTION OF THE PREFERRED EMBODIMENTS

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

Overview of the Present Embodiment

First, an overview of the present embodiment is provided to facilitate an understanding about the present embodiment.

Figure 1:
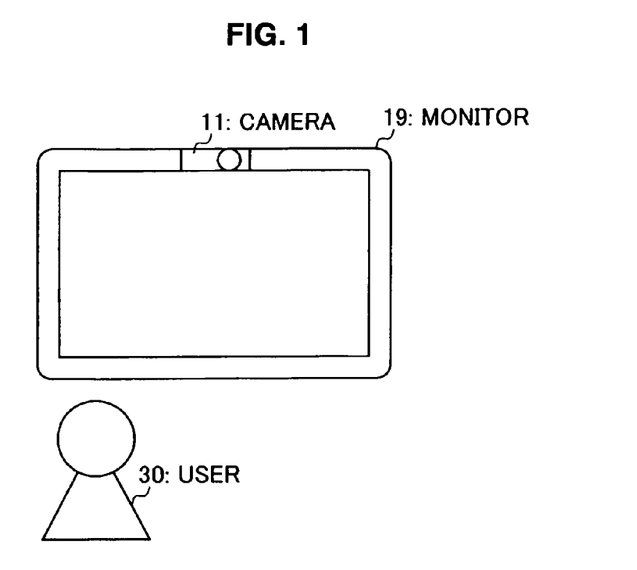
FIG. 1 is a diagram (Part 1) to explain an overview of a present embodiment.

FIG. 1 is a diagram (Part 1) to explain an overview of the present embodiment. As shown in FIG. 1, a user 30 is a person who views video displayed in a monitor 19 provided with a display apparatus (not shown) such as a TV set. The present embodiment makes video providing a sense of perspective being displayed possible by performing enhancement processing in accordance with the line of sight of the user 30. Here, the enhancement processing is video processing performed in such a way that the video is presented to the user 30 more sharply or, as described above, processing to improve sharpness of video so that sharper video is presented to the user 30. The monitor 19 has a camera 11 and the camera 11 is assumed to have a function to shoot the user 30. It is also assumed that the display apparatus (not shown) having the monitor 19 has internally a function to perform video processing and enhancement processing can be realized, for example, by the function.

Figure 2:
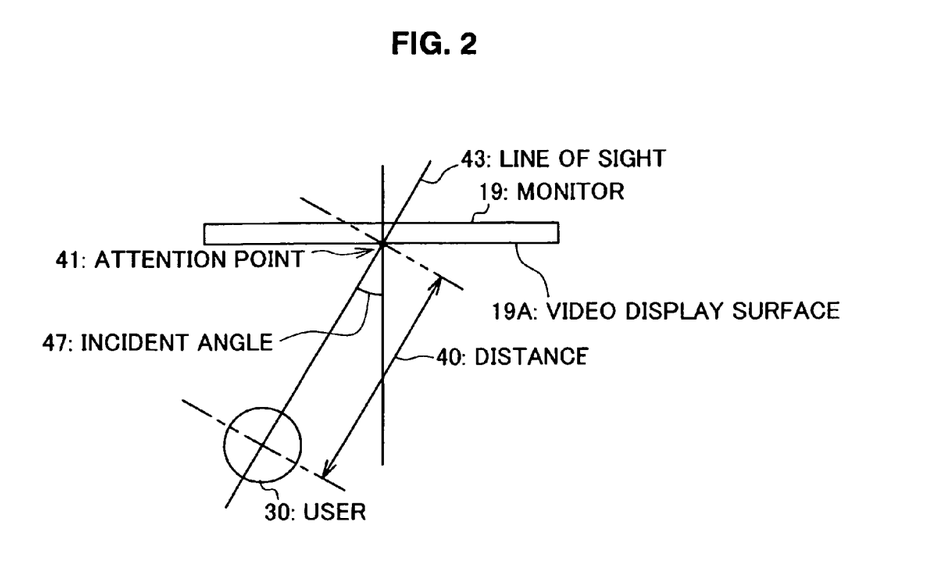
FIG. 2 is a diagram (Part 2) to explain the overview of the present embodiment.

FIG. 2 is a diagram (Part 2) to explain the overview of the present embodiment. FIG. 2 is a perspective view of the monitor 19 shown in FIG. 1 from above.

As shown in FIG. 2, the point on the monitor 19 on which the user 30 focuses attention is an attention point 41. The attention point 41 is an intersection point of a line of sight 43 of the user 30 and a video display surface 19A of the monitor 19. Moreover, an incident angle 47 of the line of sight 43 to the video display surface 19A and a distance 40, which is the shortest distance between the user 30 and the attention point 41, are specified. In the present embodiment, enhancement processing in accordance with each of the incident angle 47 and the distance 40 will also be described.

In the present embodiment, the display apparatus (not shown) detects the direction of the line of sight 43 of the user 30 using the camera 11 (See FIG. 1) and, based on the direction thereof, performs enhancement processing of video to be output to the monitor 19. In the enhancement processing, a high gain amount is set to pixels on the monitor 19 positioned near the attention point 41. Accordingly, video that is easy to view for the user 30 and provides a sense of perspective can be provided to the user 30. Here, the gain amount is a value indicating brightness of each pixel constituting the monitor 19 and refers to the luminance of each of red, green, and blue making up colors.

<<Function Configuration of Display Apparatus 10>>

Figure 3:
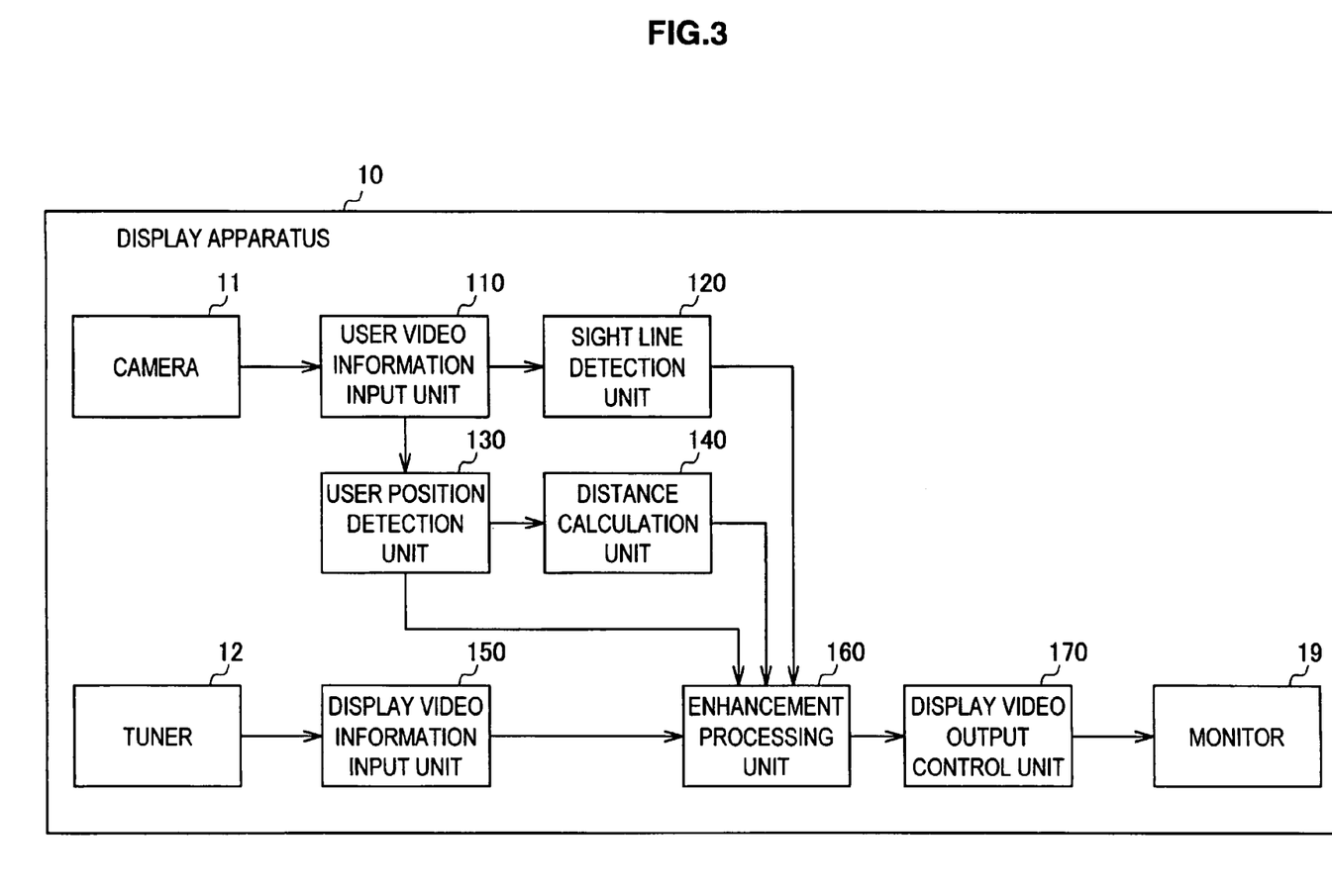
FIG. 3 is a function configuration diagram showing a function configuration of a display apparatus according to the present embodiment.

FIG. 3 is a function configuration diagram showing the function configuration of a display apparatus according to the present embodiment. The function configuration of a display apparatus according to the present embodiment will be described with reference to FIG. 3 (FIG. 1 and FIG. 2 are referenced when necessary).

As shown in FIG. 3, the display apparatus 10, which is an apparatus (such as a TV set) to display video, includes at least the camera 11, a tuner 12, a user video information input unit 110, a sight line detection unit 120, a display video information input unit 150, an enhancement processing unit 160, a display video output control unit 170, and the monitor 19. As shown in FIG. 3, the display apparatus 10 may further include a user position detection unit 130 or a distance calculation unit 140.

The camera 11 is used to acquire video information of the user 30 by shooting the user 30. The camera 11 may be, as shown in FIG. 3, contained in the display apparatus 10 or externally connectable to the display apparatus 10.

The user video information input unit 110 is used to receive input of user video information, which is acquired by the camera 11 and video information of the user 30 watching video displayed in the monitor 19. The user video information input unit 110 is constituted, for example, by a USB (Universal Serial Bus) interface.

The sight line detection unit 120 is used to detect a line of sight of the user 30 by analyzing user video information whose input is received by the user video information input unit 110. The technology to detect the line of sight of the user 30 is not specifically limited. Such a technology is provided, for example, at "Prof. Kenzo Kurihara, [online], [Search on Jun. 11, 2008], Internet <URL: http://joint.idec.or.jp/koryu/020426_2.php>". The sight line detection unit 120 is constituted by a CPU (Central Processing Unit) or the like. In this case, the function of the sight line detection unit 120 is realized by a program stored in a ROM (Read Only Memory) or the like being expanded into a RAM (Random Access Memory) or the like and the program expanded in the RAM being executed by the CPU. The sight line detection unit 120 may also be constituted, for example, by dedicated hardware.

The tuner 12 is used to select radio waves of an intended frequency from received radio waves to reproduce video displayed in the monitor 19 from the selected radio waves. Instead of using the tuner 12, video may be reproduced by using a DVD (digital versatile disk) player or the like.

The display video information input unit 150 is used to receive input of display video information to be a source of video displayed in the monitor 19. The display video information input unit 150 is constituted, for example, by dedicated hardware.

The enhancement processing unit 160 is used to detect an intersection point of the line of sight 43 of the user 30 detected by the sight line detection unit 120 and the video display surface 19A of the monitor 19 as the attention point 41, which is a point on which the user 30 focuses attention. The enhancement processing unit 160 is used to perform enhancement processing for the monitor 19 by setting a higher gain amount in stages from a position of a longer distance from the detected attention point 41 toward a position of a smaller distance.

When the gain amount is set, the enhancement processing unit 160 may set a higher gain amount in stages, among a plurality of regions divided by one or a plurality of concentric circles around the attention point 41, from a region of a longer distance from the detected attention point 41 toward a region of a smaller distance.

Figure 4:
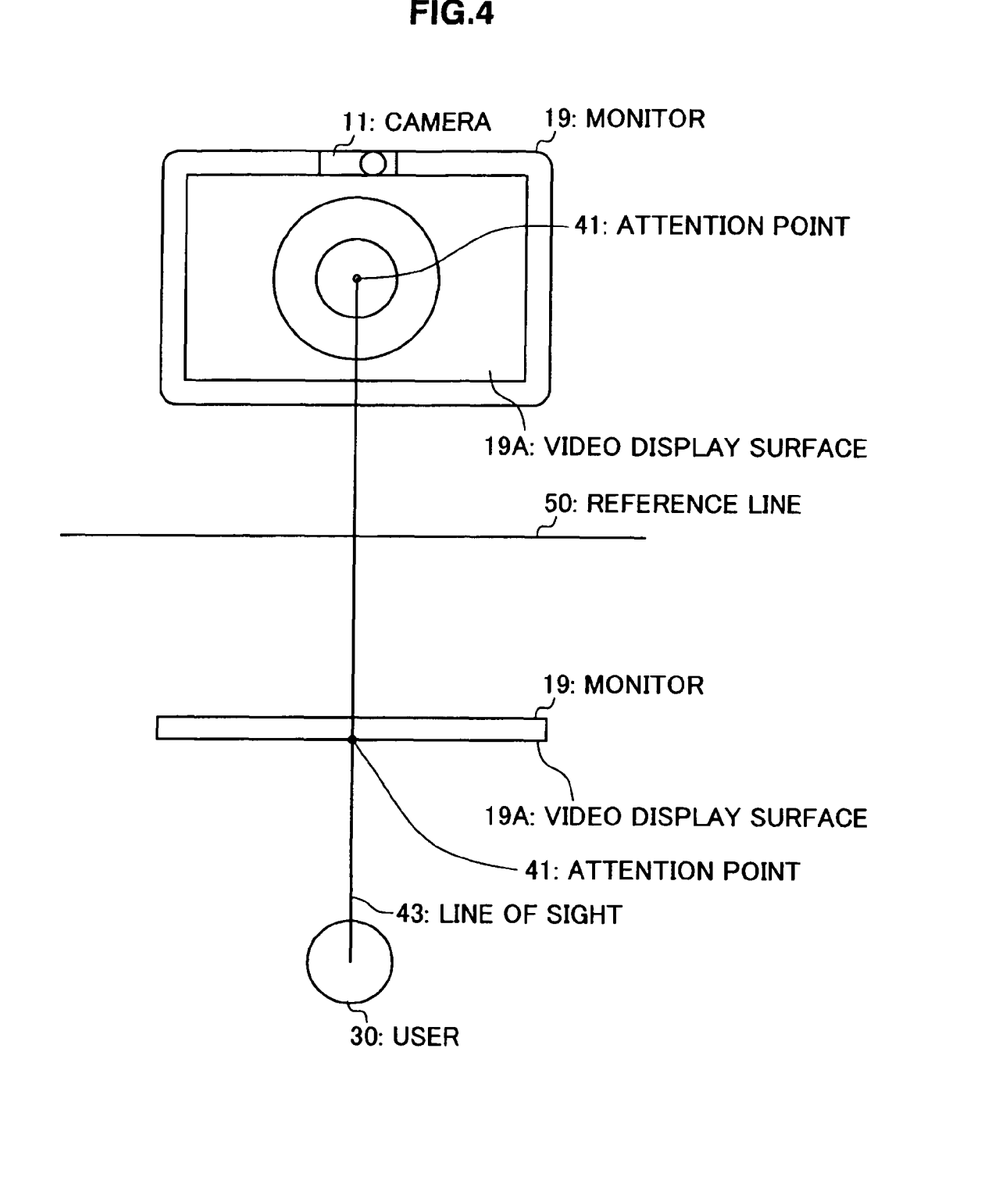
FIG. 4 is a diagram schematically showing an example (Part 1) of enhancement processing performed by an enhancement processing unit according to the present embodiment.

Further, when the gain amount is set, the enhancement processing unit 160 may have one or a plurality of concentric circles whose radius is obtained by successively increasing the distance from the attention point 41 by an increment of a predetermined length (See FIG. 4). The predetermined length is assumed to be stored, for example, in the enhancement processing unit 160.

Figure 5:
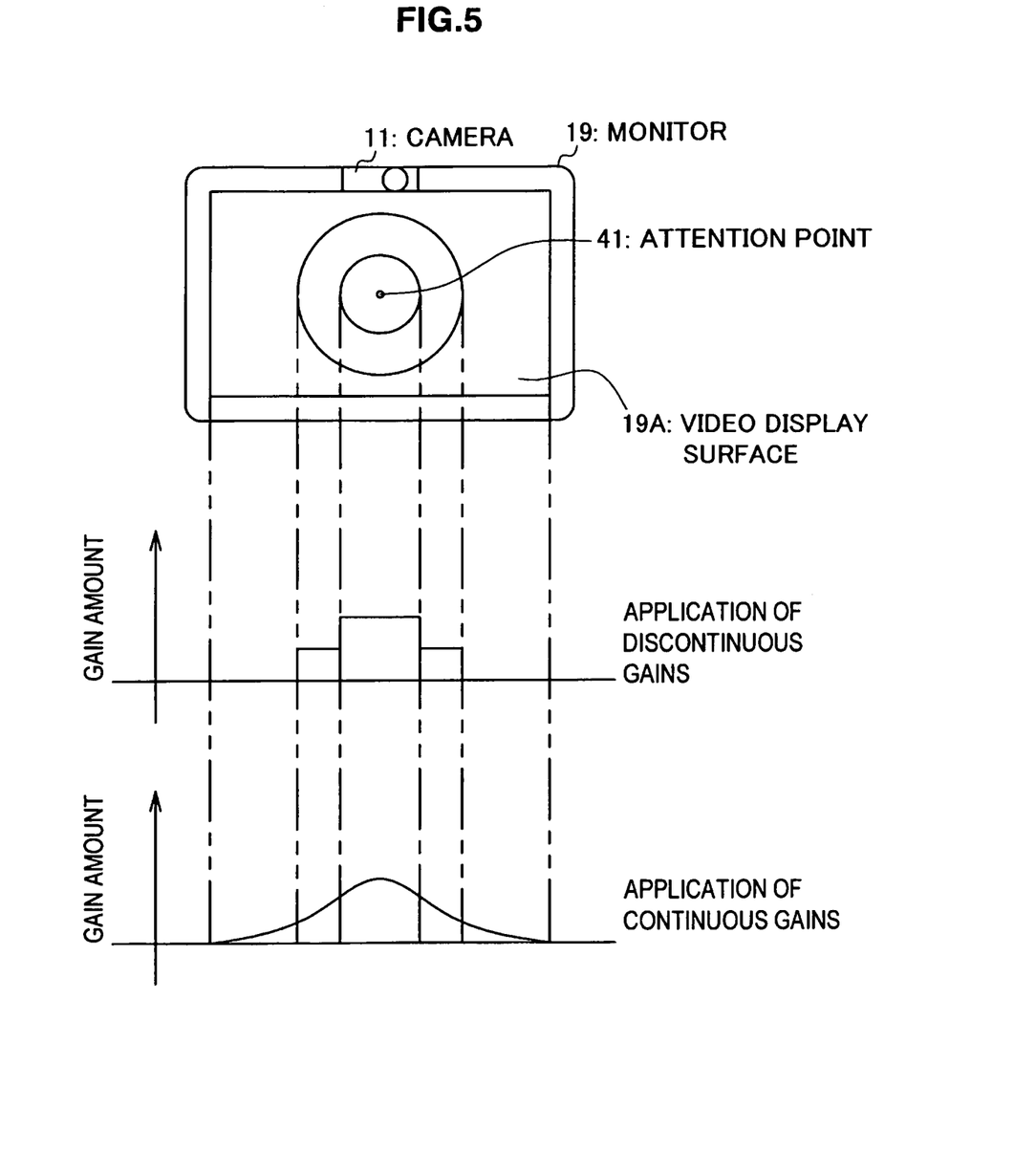
FIG. 5 is a diagram schematically showing the example (Part 2) of the enhancement processing performed by the enhancement processing unit according to the present embodiment.

When the gain amount is set, the enhancement processing unit 160 may define the predetermined length as being equal to or less than the distance between adjacent pixels constituting the monitor 19 (See FIG. 5). Accordingly, the plurality of regions divided by one or a plurality of concentric circles around the attention point 41 can be made narrower so that the gain amount changes continuously when viewed from the user 30. Therefore, video displayed in the monitor 19 can further be made to naturally generate a sense of perspective.

Figure 6:
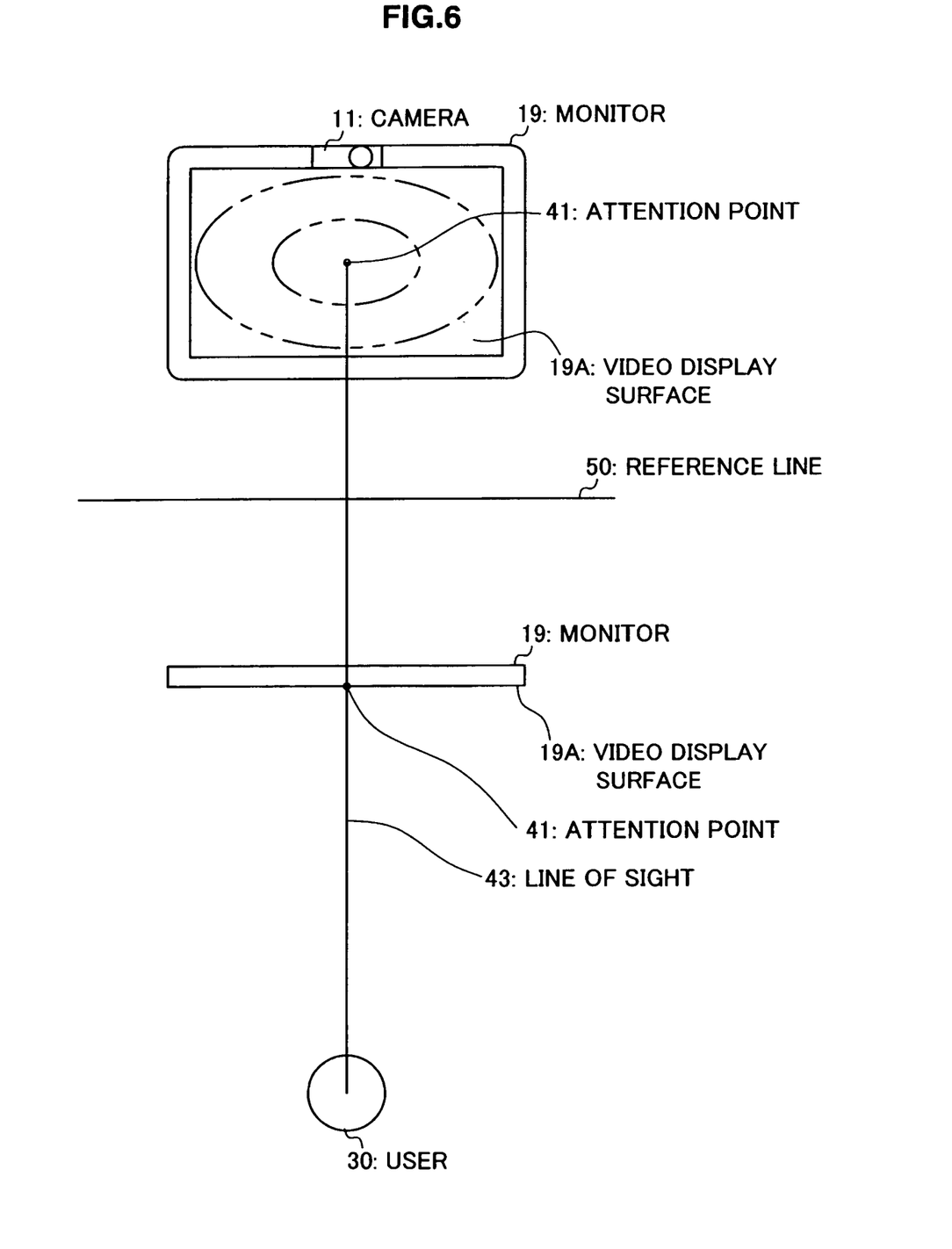
FIG. 6 is a diagram schematically showing the example (Part 3) of the enhancement processing performed by the enhancement processing unit according to the present embodiment.

Further, when the gain amount is set, the enhancement processing unit 160 may have one or a plurality of concentric circles around the attention point 41 as ellipses having a ratio matching the aspect ratio of the monitor 19 as the major axis/minor axis ratio (ratio of the length of the major axis to that of the minor axis) (See FIG. 6). Accordingly, video displayed in the monitor 19 can be made to generate a sense of perspective fitting to the form of the monitor 19. The aspect ratio of the monitor 19 may be made, for example, length:breadth=16:9 or the like, but is not specifically limited.

The enhancement processing unit 160 is constituted by a CPU or the like. In this case, the function of the enhancement processing unit 160 is realized by a program stored in a ROM or the like being expanded into a RAM or the like and the program expanded in the RAM being executed by the CPU. The enhancement processing unit 160 may also be constituted, for example, by dedicated hardware.

The display video output control unit 170 is used to output video via the monitor 19 based on the gain amount set by the enhancement processing unit 160 and display video information whose input is received by the display video information input unit 150. For example, the display video output control unit 170 is constituted by dedicated hardware.

The monitor 19 is used to display video. The monitor 19 may be, as shown in FIG. 1, contained in the display apparatus 10 or externally connectable to the display apparatus 10.

The user position detection unit 130 is used to detect the position of the user 30. A technology to detect the position of the user 30 will be described later with reference to FIG. 8, but the present embodiment is not limited to the technology.

The user position detection unit 130 is constituted by a CPU or the like. In this case, the function of the user position detection unit 130 is realized by a program stored in a ROM or the like being expanded into a RAM or the like and the program expanded in the RAM being executed by the CPU. The user position detection unit 130 may also be constituted, for example, by dedicated hardware.

If the display apparatus 10 further includes the user position detection unit 130, the enhancement processing unit 160 can set the gain amount by a different technology from the technology described above. The technology will be described below with reference to FIG. 7.

The distance calculation unit 140 is used to calculate the distance between the monitor 19 and the user 30. An exemplary technology to calculate the distance between the monitor 19 and the user 30 will be described later with reference to FIG. 9, but the present embodiment is not limited to the technology.

If the display apparatus 10 further includes the distance calculation unit 140, the enhancement processing unit 160 can set the gain amount by a different technology from the technology described above. That is, with an increasing distance between the monitor 19 and the user 30 calculated by the distance calculation unit 140, a higher gain amount can be set in stages. Accordingly, weaker enhancement processing is performed when watched from a relatively short distance and stronger enhancement processing when watched from a relatively long distance so that video of almost the same appearance can be displayed in both cases when viewed from the user 30.

The user video information input unit 110, the sight line detection unit 120, the user position detection unit 130, the distance calculation unit 140, the display video information input unit 150, the enhancement processing unit 160, and the display video output control unit 170 are constituted by LSI (Large Scale Integration) or the like and are central devices of the display apparatus 10.

<<Enhancement Processing Performed by the Enhancement Processing Unit 160>>

FIG. 4 is a diagram schematically showing an example (Part 1) of enhancement processing performed by an enhancement processing unit according to the present embodiment. An example of enhancement processing performed by an enhancement processing unit according to the present embodiment will be described with reference to FIG. 4.

Reference to FIG. 4 shows that an aspect when the monitor 19 is viewed from the front is schematically shown above a reference line 50 and that when the monitor 19 is viewed from above is schematically shown below the reference line 50 (This also applies to FIG. 6 and FIG. 7).

The sight line detection unit 120 detects the line of sight 43 of the user 30. The enhancement processing unit 160 detects an intersection point of the line of sight 43 of the user 30 detected by the sight line detection unit 120 and the video display surface 19A of the monitor 19 as the attention point 41, which is a point on which the user 30 focuses attention. The enhancement processing unit 160 also performs enhancement processing for the monitor 19 by setting a higher gain amount in stages from a position of a longer distance from the detected attention point 41 toward a position of a smaller distance. Here, in the example shown in FIG. 4, the enhancement processing unit 160 has two concentric circles whose radius is obtained by successively increasing the distance from the attention point 41 by an increment of a predetermined length when the gain amount is set.

FIG. 5 is a diagram schematically showing the example (Part 2) of enhancement processing performed by the enhancement processing unit according to the present embodiment. An example of enhancement processing performed by the enhancement processing unit according to the present embodiment will be described with reference to FIG. 5.

Reference to FIG. 5 shows that an aspect when the monitor 19 is viewed from the front is shown and graphs for "Application for discontinuous gains" and "Application for continuous gains" are shown thereunder.

Two concentric circles around the attention point 41 are shown in the monitor 19 and the video display surface 19A is divided into three regions by these concentric circles. If a higher gain amount is set in stages from a region of a longer distance from the detected attention point 41 toward a region of a smaller distance, discontinuous gain amounts like the graph "Application for discontinuous gains" shown in FIG. 5 are set by the enhancement processing unit 160. Here, the radius of each of the two concentric circles shown in the monitor 19 is a radius that is obtained by successively increasing the distance from the attention point 41 by an increment of a predetermined length.

The enhancement processing unit 160 can set the gain amount in such a way that the gain amount changes continuously when viewed from the user 30 by making the predetermined length smaller. For example, the predetermined length may be defined as being equal to or less than the distance between adjacent pixels constituting the monitor 19. Then, continuous gain amounts like the graph "Application for continuous gains" shown in FIG. 5 are set by the enhancement processing unit 160.

FIG. 6 is a diagram schematically showing the example (Part 3) of enhancement processing performed by the enhancement processing unit according to the present embodiment. An example of enhancement processing performed by the enhancement processing unit according to the present embodiment will be described with reference to FIG. 6.

In the example shown in FIG. 6, the enhancement processing unit 160 has two concentric circles around the attention point 41 as ellipses having a ratio matching the aspect ratio of the monitor 19 as the major axis/minor axis ratio when the gain amount is set.

Figure 7:
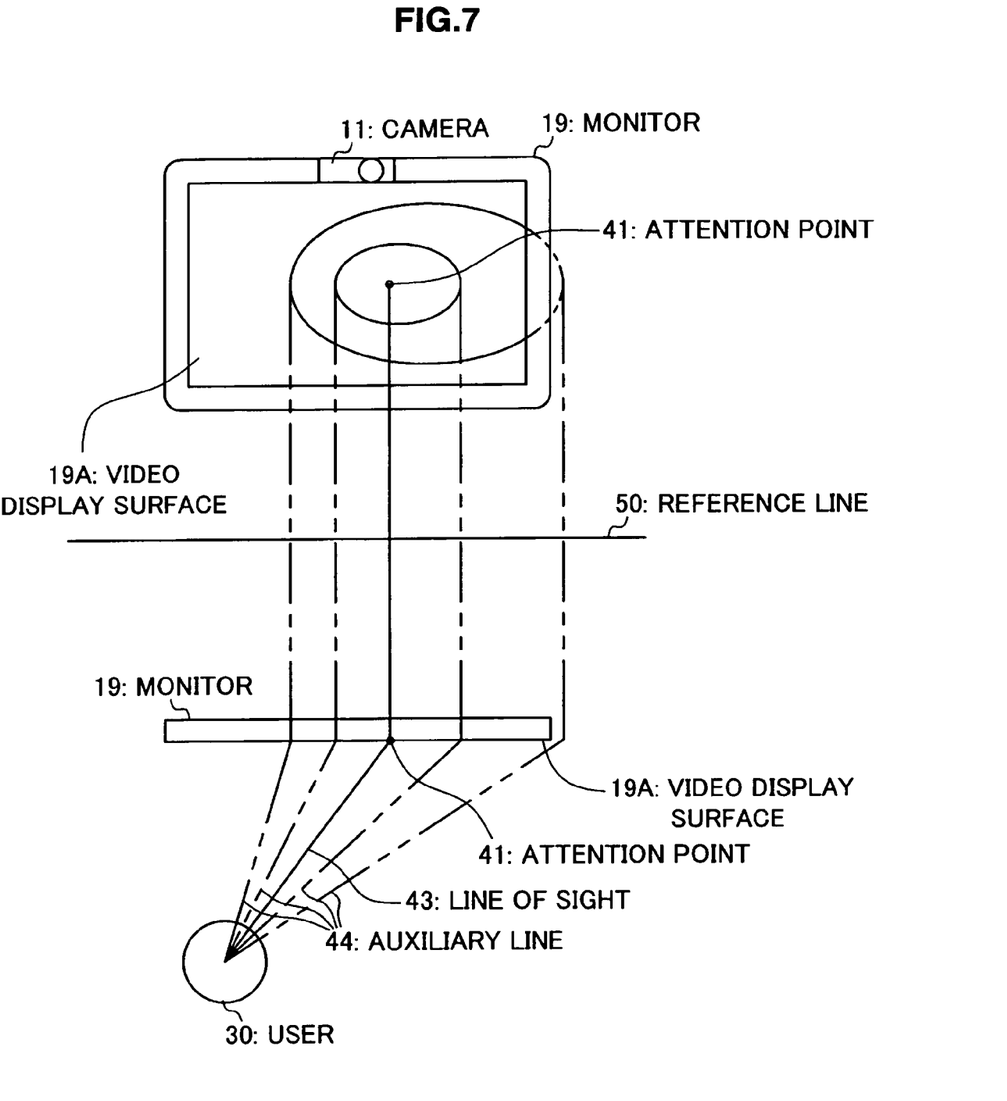
FIG. 7 is a diagram schematically showing the example (Part 4) of the enhancement processing performed by the enhancement processing unit according to the present embodiment.

FIG. 7 is a diagram schematically showing the example (Part 4) of enhancement processing performed by the enhancement processing unit according to the present embodiment. An example of enhancement processing performed by the enhancement processing unit according to the present embodiment will be described with reference to FIG. 7.

In the example shown in FIG. 7, the position of the user 30 is detected by the user position detection unit 130. In such a case, the enhancement processing unit 160 defines a set of intersection points of a group of lines forming a predetermined angle to the line of sight 43 of the user 30 with the position of the user 30 as a reference point and the video display surface 19A of the monitor 19 as a boundary when the gain amount is set. In the example shown in FIG. 7, each of four auxiliary lines 44 corresponds to a group of lines.

By setting one or a plurality of such angles, the enhancement processing unit 160 divides the monitor 19 into a plurality of regions by the boundary. In the example shown in FIG. 7, two such angles are set. The enhancement processing unit 160 sets, among the plurality of regions, a higher gain amount in stages from a region of a longer distance from the detected attention point 41 toward a region of a smaller distance. The predetermined angle is assumed to be held, for example, by the enhancement processing unit 160, which may hold different angles in the longitudinal direction and the lateral direction of the monitor 19.

According to the above assumption, as the user 30 moves away from the monitor 19, intersection points of the monitor 19 and the auxiliary lines 44 change, which is accompanied by changes of concentric circles. For example, when the strength of enhancement processing in the innermost concentric circle region is the same, the size of region where relatively strong enhancement processing is performed increases if the distance between the user 30 and the monitor 19 is long. As a result, the user 30 can maintain the appearance constant to some extent regardless of the distance between the user 30 and the monitor 19.

When the user 30 watches the monitor 19 obliquely, the shape of the boundary changes to an ellipse having a larger major axis ratio with the increasing incident angle 47. Therefore, even if the user 30 watches the monitor 19 obliquely, video displayed in the monitor 19 can further be made to naturally generate a sense of perspective.

<<User Position Detection Processing Performed by the User Position Detection Unit 130>>

Figure 8:
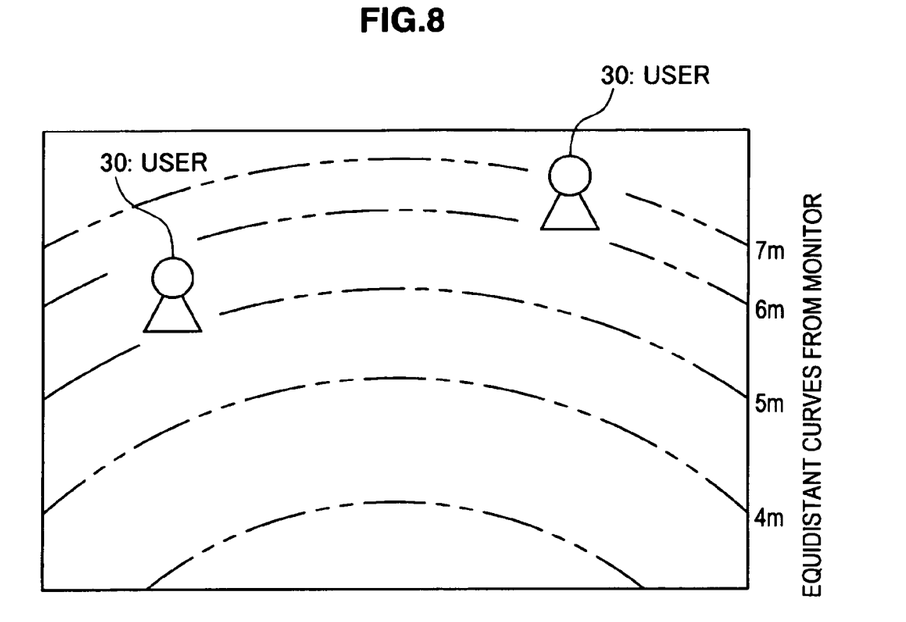
FIG. 8 is a diagram schematically showing an example of user position detection processing performed by a user position detection unit according to the present embodiment.

FIG. 8 is a diagram schematically showing an example of user position detection processing performed by a user position detection unit according to the present embodiment. An example of user position detection processing performed by a user position detection unit according to the present embodiment will be described with reference to FIG. 8 (Other figures are also referenced if necessary).

FIG. 8 shows an aspect of the user 30 when viewed from a lens of the camera 11. FIG. 8 further has equidistant curves added thereto and if zooming and others are assumed constant, the distance between the monitor 19 and an object such as the user 30 is represented by equidistant curves. Video as shown in FIG. 8 is shot by the camera 11 and information thereof is acquired by the user position detection unit 130 via the user video information input unit 110 for analysis. For example, by analyzing video information of the user 30 whose input is received by the user video information input unit 110, the user position detection unit 130 can define the detected position of feet of the user 30 as the position of the user 30.

The enhancement processing unit 160 may set the gain amount by assuming that one angle or each of a plurality of angles formed with the line sight 43 is successively increased by an increment of a predetermined angle.

<<Distance Calculation Processing Performed by Distance Calculation Unit 140>>

Figure 9:
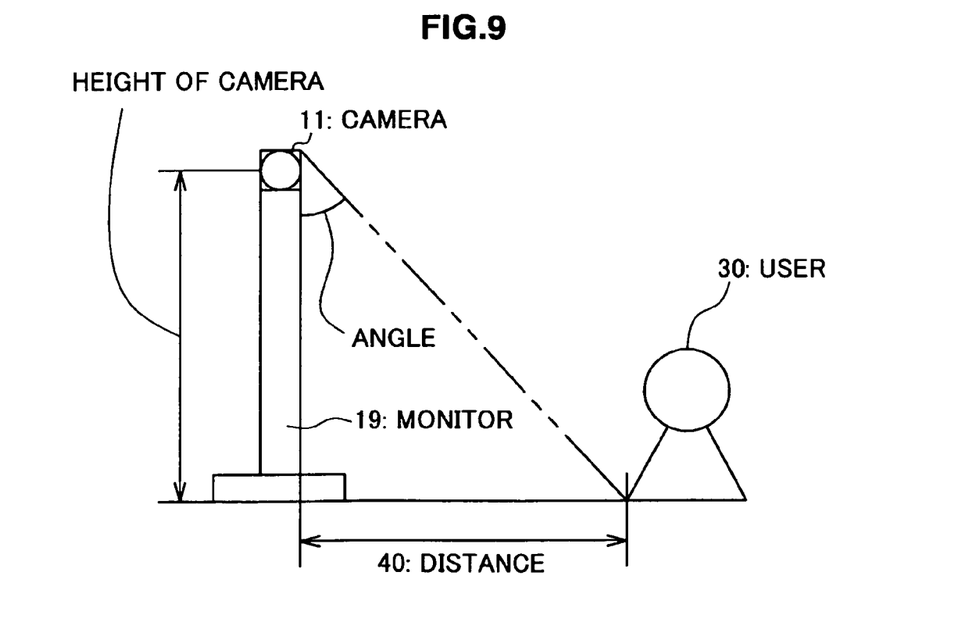
FIG. 9 is a diagram schematically showing an example of distance calculation processing performed by a distance calculation unit according to the present embodiment.

FIG. 9 is a diagram schematically showing an example of distance calculation processing performed by a distance calculation unit according to the present embodiment. An example of distance calculation processing performed by a distance calculation unit according to the present embodiment will be described with reference to FIG. 9.

As shown in FIG. 9, the relative position of the camera 11 to the monitor 19 is fixed. Thus, the position of the user 30 when the monitor 19 is set as a reference position can be calculated using the relative position and a relative position of the user 30 when the camera 11 is set as a reference position detected by the user position detection unit 130, so that the distance 40 can be calculated.

When the display apparatus 10 further includes the distance calculation unit 140, the enhancement processing unit 160 can perform enhancement processing appropriate for a distance between the monitor 19 and the user 30 by considering the distance. For example, by setting a higher gain amount in stages with an increasing distance between the monitor 19 and the user 30, enhancement processing for the monitor 19 can be performed. In this manner, sharp video can be watched even if the user 30 is apart from the monitor 19.

<<When a Plurality of the Users 30 is Present>>

Figure 10:
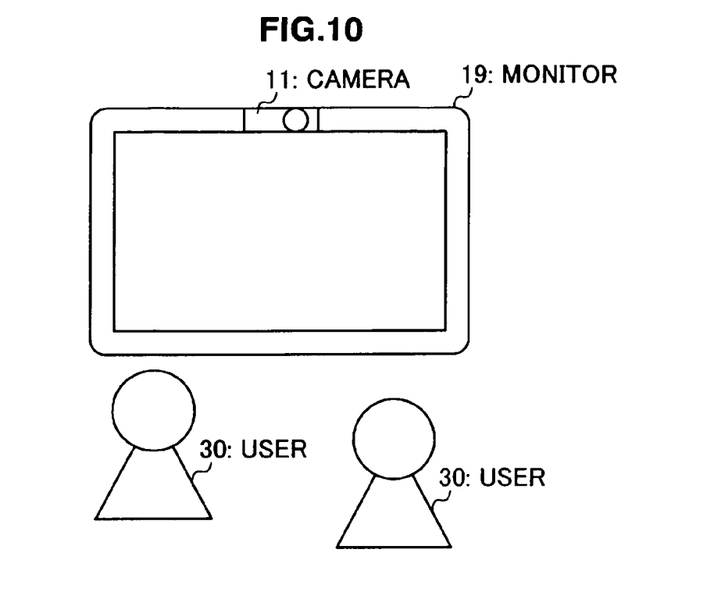
FIG. 10 is a diagram illustrating a case in which a plurality of users is present.

FIG. 10 is a diagram illustrating a case in which a plurality of users is present. A case in which the plurality of users is present will be described with reference to FIG. 10.

FIG. 10 shows a case in which the number of the users 30 present is two as an example of a case in which a plurality of the users 30 is present. In this case, more precise enhancement processing can be performed by performing existing processing when the number of the users 30 is one for two persons.

If, for example, the two users 30 turn the lines of sight on the same region, stronger enhancement processing can be performed around the region. If the two users 30 turn the lines of sight 43 on different regions, enhancement processing can be performed on different regions based on information about each of the different regions. The processing can also be applied when the number of the users 30 is three or more.

More specifically, the sight line detection unit 120 detects the lines of sight of the users 30 by detecting a plurality of lines of sight as a line of sight of each of the plurality of the users 30. The enhancement processing unit 160 detects intersection points of the line of sight of each of the plurality of the users 30 detected by the sight line detection unit 120 and the video display surface 19A of the monitor 19 as each attention point, which is a point on which each of the plurality of the users 30 focuses attention. The enhancement processing unit 160 performs enhancement processing by setting a higher gain amount from a long distance from each attention point toward a shorter position and superimposing the gain amount on each attention point.

Figure 11:
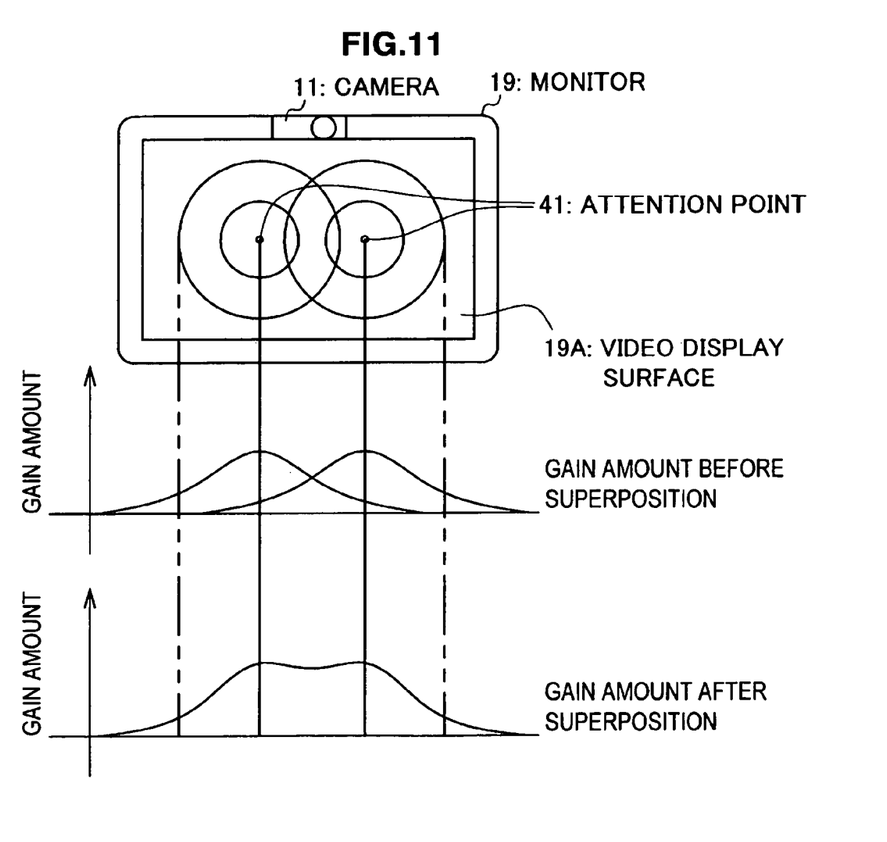
FIG. 11 is a diagram illustrating how to apply a gain when the plurality of users is present.

FIG. 11 is a diagram illustrating how to apply a gain when the plurality of users is present. How to apply a gain when the plurality of users is present will be described with reference to FIG. 11.

Reference to FIG. 11 shows that concentric circles around each of the two attention points 41 are overlapped. In such a case, if the enhancement processing unit 160 calculates the gain amount separately for the plurality of the users 30, each gain amount will be like "Gain amount before superimposition" in FIG. 11.

Then, the enhancement processing unit 160 adds each gain amount calculated separately. That is, each gain amount is superimposed. The result of superimposition will be like "Gain amount after superimposition" in FIG. 11. However, if, as a result of superimposition, the gain amount after superimposition exceeds a predetermined range or becomes larger than a preset threshold value, the gain amount can be adjusted by calculation such as a subtraction of a fixed value from the gain amount after superimposition or a multiplication by a value less than 1.

<<Flow of Processing Performed by Display Apparatus 10>>

Figure 12:
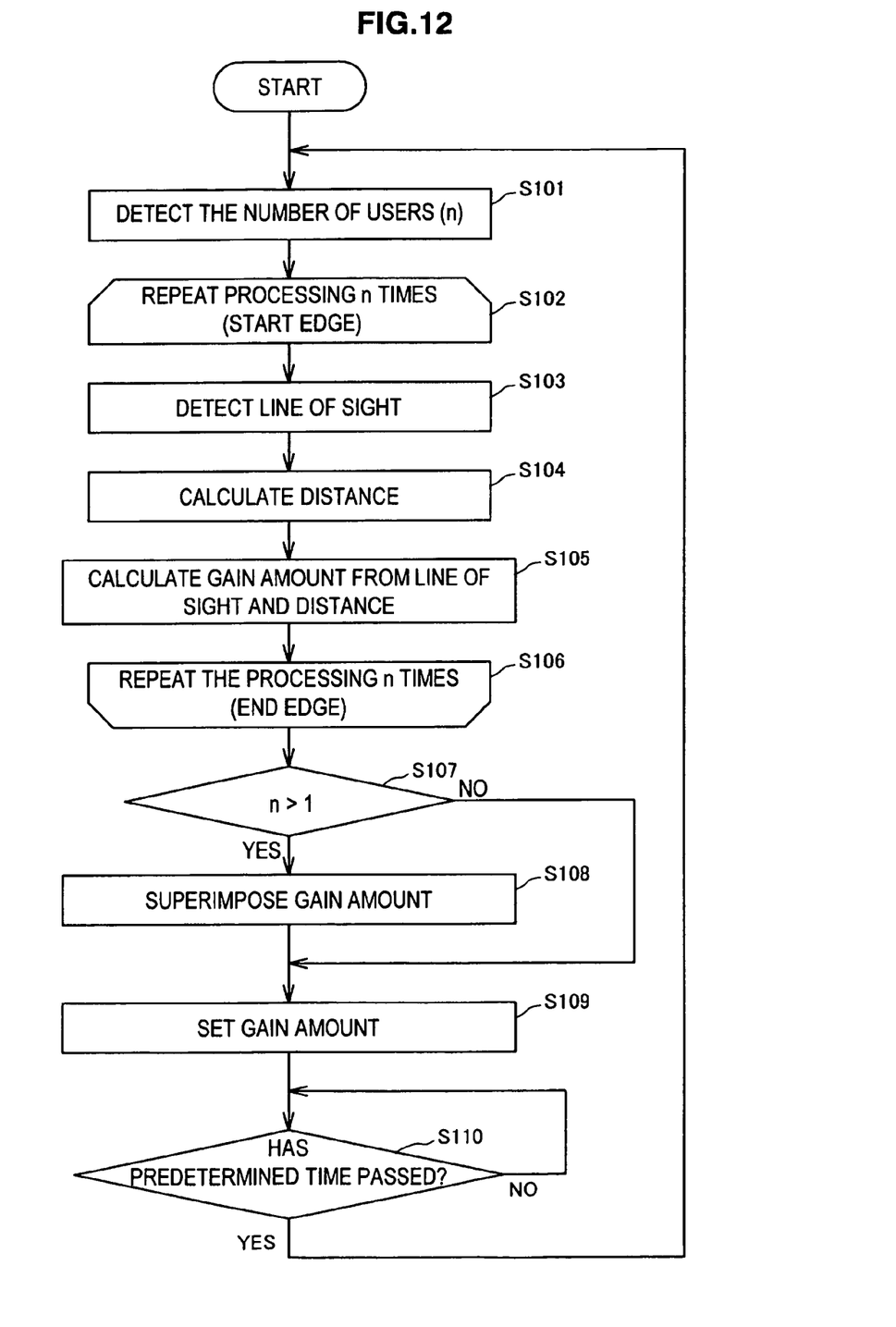
FIG. 12 is a flow chart showing a flow of processing performed by the display apparatus according to the present embodiment.

FIG. 12 is a flow chart showing a flow of processing performed by the display apparatus according to the present embodiment. The flow of processing performed by the display apparatus according to the present embodiment will be described with reference to FIG. 12 (Other figures are also referenced if necessary). Here, it is assumed that the number n of the user 30 is present.

The user video information input unit 110 receives input of user video information, which is acquired by the camera 11 and video information of the user 30 watching video displayed in the monitor 19. Subsequently, the sight line detection unit 120 analyzes the user video information whose input is received by the user video information input unit 110 to detect the number of the users 30 (step S101). The display apparatus 10 performs processing (step S102 to step S106) repeating as many times as the number of the users 30 (n persons) detected by the sight line detection unit 120.

In the repetitive processing, the sight line detection unit 120 detects the lines of sight 43 of the users 30 (step S103). Then, the distance calculation unit 140 calculates the distance 40 between the user 30 and the monitor 19 (step S104). The enhancement processing unit 160 calculates the gain amount of each pixel in the monitor 19 from the line of sight 43 and the distance 40 (step S105).

When the repetitive processing ends, the enhancement processing unit 160 determines whether the number n of the users 30 is larger than 1 (step S107). If the number n of the users 30 is determined to be larger than 1 ("YES" at step S107), the enhancement processing unit 160 superimposes calculated gain amounts (step S108) before proceeding to step S109. If the number n of the users 30 is determined to be equal to or less than 1 ("NO" at step S107), the enhancement processing unit 160 proceeds to step S109.

The enhancement processing unit 160 sets the gain amount (step S109) and determines whether a predetermined time has passed (step S110). If the predetermined time is determined not to have passed ("NO" at step S110), the enhancement processing unit 160 waits until the predetermined time has passed. If the predetermined time is determined to have passed ("YES" at step S110), the enhancement processing unit 160 returns to step S101 to repeat the processing.

<<When a Plurality of the Cameras 11 is Present>>

Figure 13:
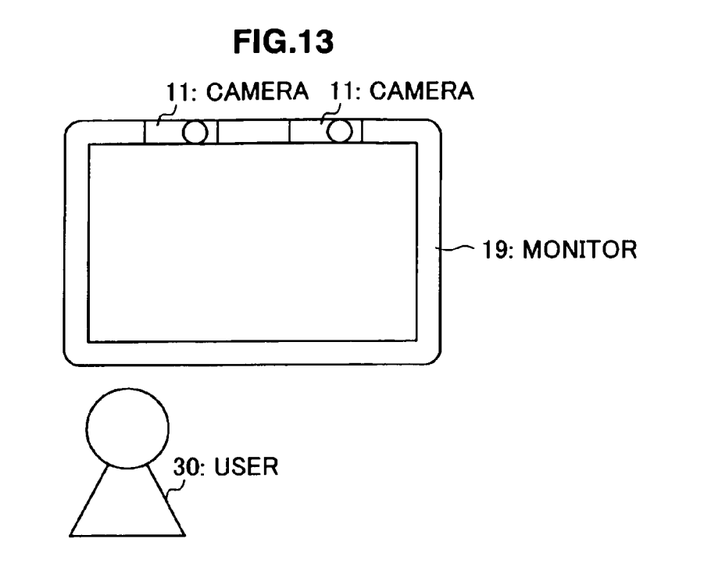
FIG. 13 is a diagram illustrating a case in which a plurality of cameras is present.

FIG. 13 is a diagram illustrating a case in which a plurality of cameras is present. A case in which a plurality of cameras is present will be described with reference to FIG. 13.

As shown in FIG. 13, when a plurality of the cameras 11 is present, it is expected that detection will be more precise when the position and line of sight 43 of the user 30 are detected by shooting the user 30 by the plurality of the cameras 11.

<<When Combined with an Existing Method>>

Figure 14:
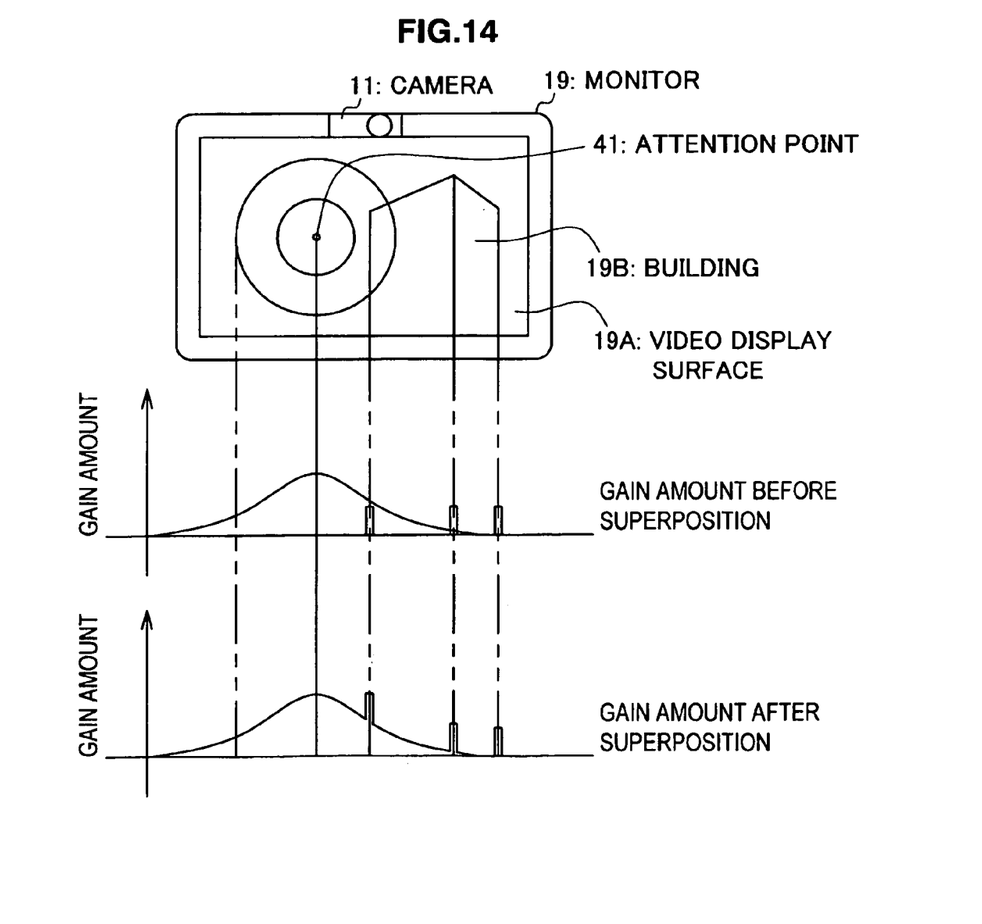
FIG. 14 is a diagram illustrating a case in which an existing method and a method according to the present embodiment are combined.

FIG. 14 is a diagram illustrating a case in which an existing method and a method according to the present embodiment are combined. A case in which an existing method and a method according to the present embodiment are combined will be described with reference to FIG. 14.

Here, the existing method is assumed to be a method that sets the gain amount in accordance with video content. As shown in FIG. 14, video contains, for example, a building 19B and enhancement processing according to the existing method has been performed on edges thereof. In such a case, if the gain amount is calculated separately by each method, each gain amount will be like "Gain amount before superimposition" in FIG. 14.

The enhancement processing unit 160 superimposes the gain amount set by the existing method and that set by a method according to the present embodiment. The result of superimposition is, for example, like "Gain amount after superimposition" in FIG. 14. However, if, as a result of superimposition, the gain amount after superimposition exceeds a predetermined range or becomes larger than a preset threshold value, the gain amount can be adjusted by calculation such as a subtraction of a fixed value from the gain amount after superimposition or a multiplication by a value less than 1.

Enhancement processing is not limited to the above combination and a plurality of types of enhancement processing can be combined for processing. For example, assume that a method that performs enhancement processing on a focused region by a method according to the present embodiment is a method 1. Further, assume that a method that detects a face portion by adaptive processing of video itself and makes enhancement processing weaker to make video of the portion more desirable video is a method 2. The user 30 can watch more desirable video by performing integrated enhancement processing considering both the method 1 and the method 2 than when enhancement processing is performed separately.

By combining with an existing method for performing enhancement processing adapted to video itself, enhancement processing can be performed while retaining advantages of the existing method.

According to the present embodiment, enhancement processing suiting the user's 30 preference can be performed compared with a case in which enhancement processing is performed based on information of video itself by controlling strength of the enhancement processing around the attention point 41 on which the user 30 himself (herself) focuses attention. Further, video providing a sense of perspective can be displayed in accordance with the line of sight of the user.

Moreover, appropriate enhancement processing for different spatial relationships, for example, when viewed from the front and obliquely can be performed by detecting the position and the line of sight 43 of the user 30.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:
   a display video information input unit that receives input of display video information to be a source of video displayed in a monitor;
   a camera or cameras;
   a user video information input unit that receives input of user video information, which is acquired by the camera or cameras and video information of a user watching video displayed in the monitor;

a sight line detection unit that detects a line of sight of the user by analyzing the user video information whose input is received by the user video information input unit;

an enhancement processing unit that detects an intersection point of the line of sight of the user detected by the sight line detection unit and a video display surface of the monitor as an attention point and performs enhancement processing for the monitor by setting a higher gain amount in stages from a position of a longer distance from the attention point toward a position of a smaller distance; and a display video output control unit that outputs video via the monitor based on the gain amount set by the enhancement processing unit and the display video information whose input is received by the display video information input unit, said user video information input unit and said sight line detection unit being operable to detect a number of users currently watching the video displayed in the monitor, and when a detection result thereof indicates that more than one user is currently watching the video displayed in the monitor said enhancement processing unit obtains a respective attention point for each detected user and performs the enhancement processing with regard thereto to obtain a respective gain amount for said each detected user and superimposes gain amounts for all detected users by adding together each said respective gain amount to obtain a superimposed gain amount which is utilized in outputting the video via the monitor, wherein when the superimposed gain amount obtained by the enhancement processing unit exceeds a predetermined amount, the superimposed gain amount is reduced by subtracting a value therefrom or by multiplying by a value less than one.

2. The display apparatus according to claim 1, wherein the enhancement processing unit sets a higher gain amount in stages from a position of a longer distance from each said attention point toward the position of a shorter distance by setting the higher gain amount in stages, among a plurality of regions divided by one or a plurality of concentric circles around each said attention point, from the region of the longer distance from each said attention point toward the region of the smaller distance.

3. The display apparatus according to claim 2, wherein the enhancement processing unit sets the gain amount by obtaining a radius of the one concentric circle or each of the plurality of concentric circles by successively increasing the distance from each said attention point by an increment of a predetermined length.

4. The display apparatus according to claim 3, wherein the enhancement processing unit sets the gain amount by defining the predetermined length as being equal to or less than the distance between adjacent pixels constituting the monitor.

5. The display apparatus according to claim 2, wherein the enhancement processing unit sets the gain amount by defining the one or the plurality of concentric circles around each said attention point as ellipses having a ratio matching the aspect ratio of the monitor as the major axis/minor axis ratio.

6. The display apparatus according to claim 1, further comprising:

a user position detection unit that detects the position of each user, wherein the enhancement processing unit defines a set of intersection points of a group of lines forming a predetermined angle to the line of sight of each respective user with the position of the respective user detected by the user position detection unit as a reference point and the video display surface of the monitor as a boundary, divides the monitor into a plurality of regions by the boundary by setting one or a plurality of the angles, and sets a higher gain amount in stages from the position of a longer distance from the respective attention point toward the position of a shorter distance by setting the higher gain amount in stages, among the plurality of regions, from the region of the longer distance from the respective attention point toward the region of the smaller distance.

7. The display apparatus according to claim 6, wherein the enhancement processing unit sets the gain amount by obtaining the one angle or each of the plurality of angles by successively increasing the angle formed with the line sight by an increment of a predetermined angle.

8. The display apparatus according to any one of claim 1, further comprising:

a distance calculation unit that calculates the distance between the monitor and each user, wherein the enhancement processing unit performs enhancement processing for the monitor by setting the higher gain amount in stages with the increasing distance between the monitor and the respective user calculated by the distance calculation unit.

9. A display method, comprising the steps of:

receiving input of display video information to be a source of video displayed in a monitor through a display video information input unit;

receiving input of user video information, which is acquired by a camera or cameras and video information of a user watching video displayed in the monitor through a user video information input unit;

detecting a line of sight of the user by analyzing the user video information whose input is received by the user video information input unit through a sight line detection unit;

detecting an intersection point of the line of sight of the user detected by the sight line detection unit and a video display surface of the monitor as an attention point and performing enhancement processing for the monitor by setting a higher gain amount in stages from a position of a longer distance from the attention point toward a position of a smaller distance through an enhancement processing unit; and outputting video via the monitor based on the gain amount set by the enhancement processing unit and the display video information whose input is received by the display video information input unit through a display video output control unit, and further comprising the steps of:

detecting by use of said user video information input unit and said sight line detection unit a number of users currently watching the video displayed in the monitor, and when a detection result thereof indicates that more than one user is currently watching the video displayed in the monitor obtaining by use of said enhancement processing unit a respective attention point for each detected user and performing the enhancement processing with regard thereto to obtain a respective gain amount for said each detected user and superimposing gain amounts for all detected users by adding together each said respective gain amount to obtain a superimposed gain amount which is utilized in the outputting of the video via the monitor, wherein when the superimposed gain amount exceeds a predetermined amount, the superimposed gain amount is reduced by subtracting a value therefrom or by multiplying by a value less than one.

* * * * *